Figure 1:
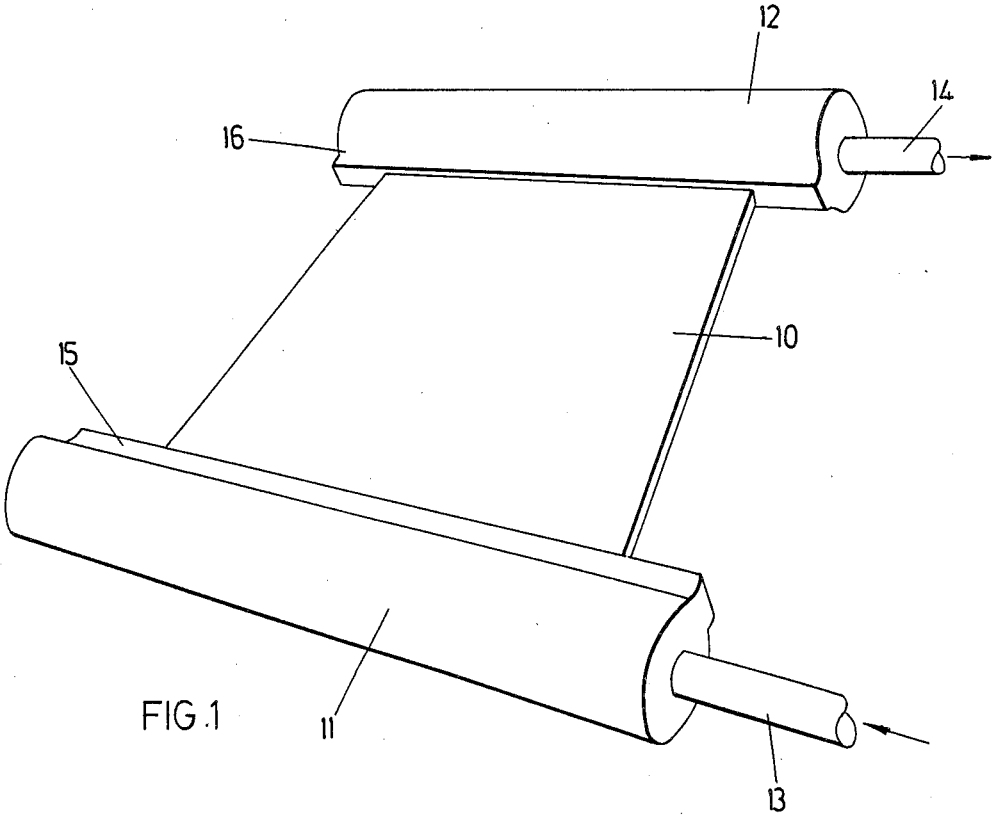
Figure 2:
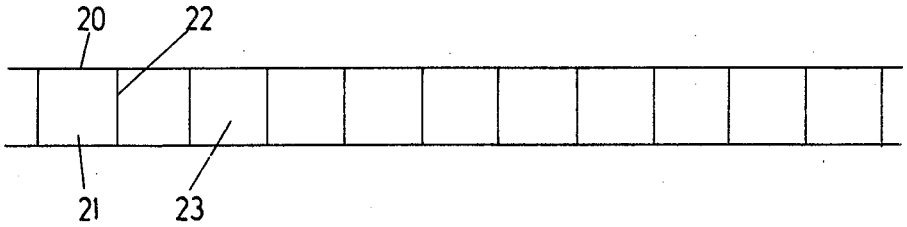
Figure 3:
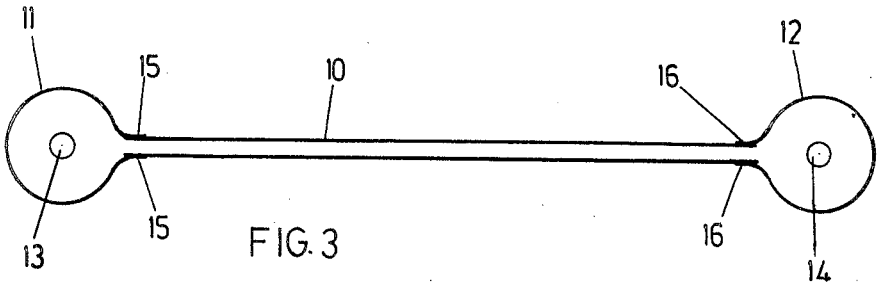
Figure 4:
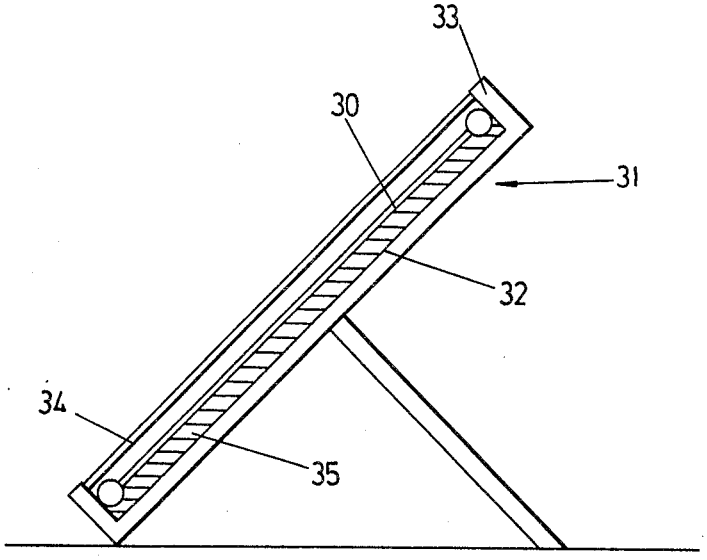
Figure 5:
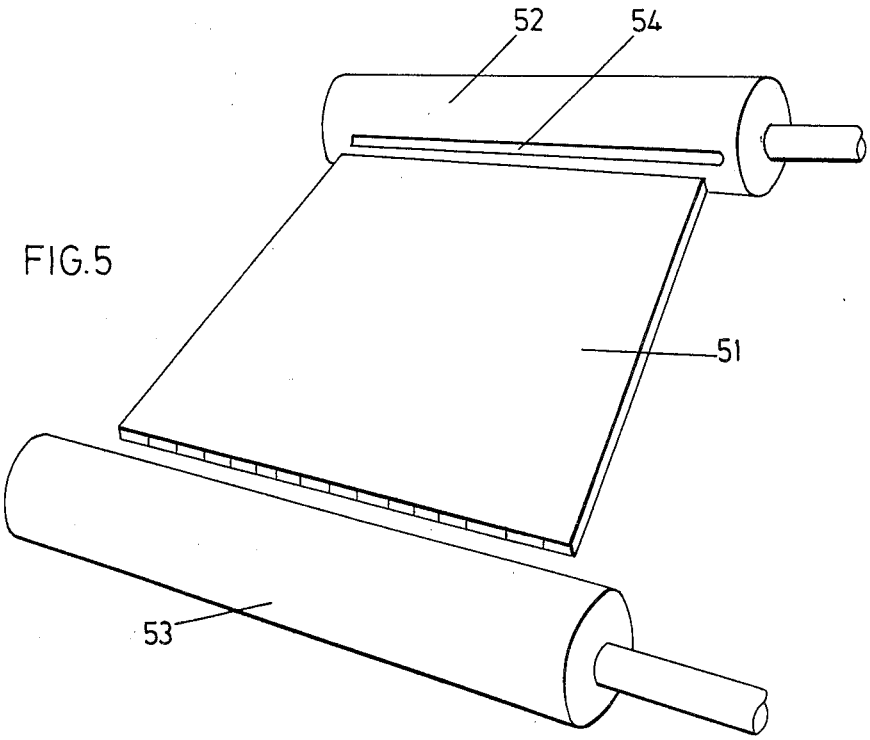
Figure 6:
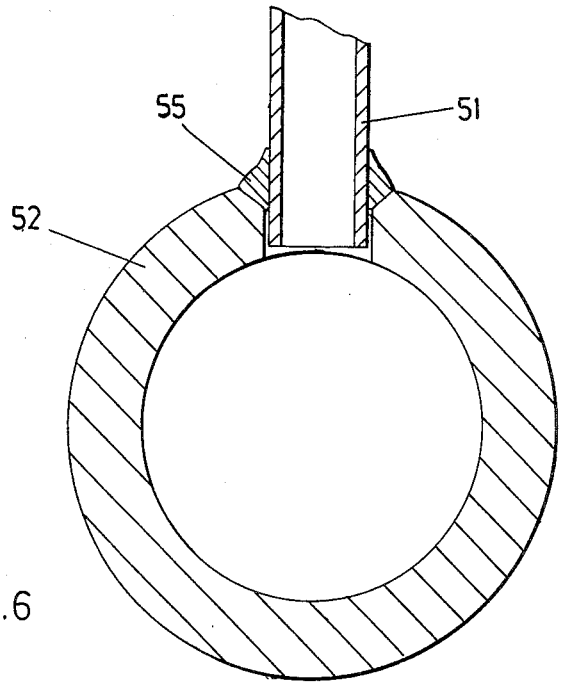
Figures 7, 8:
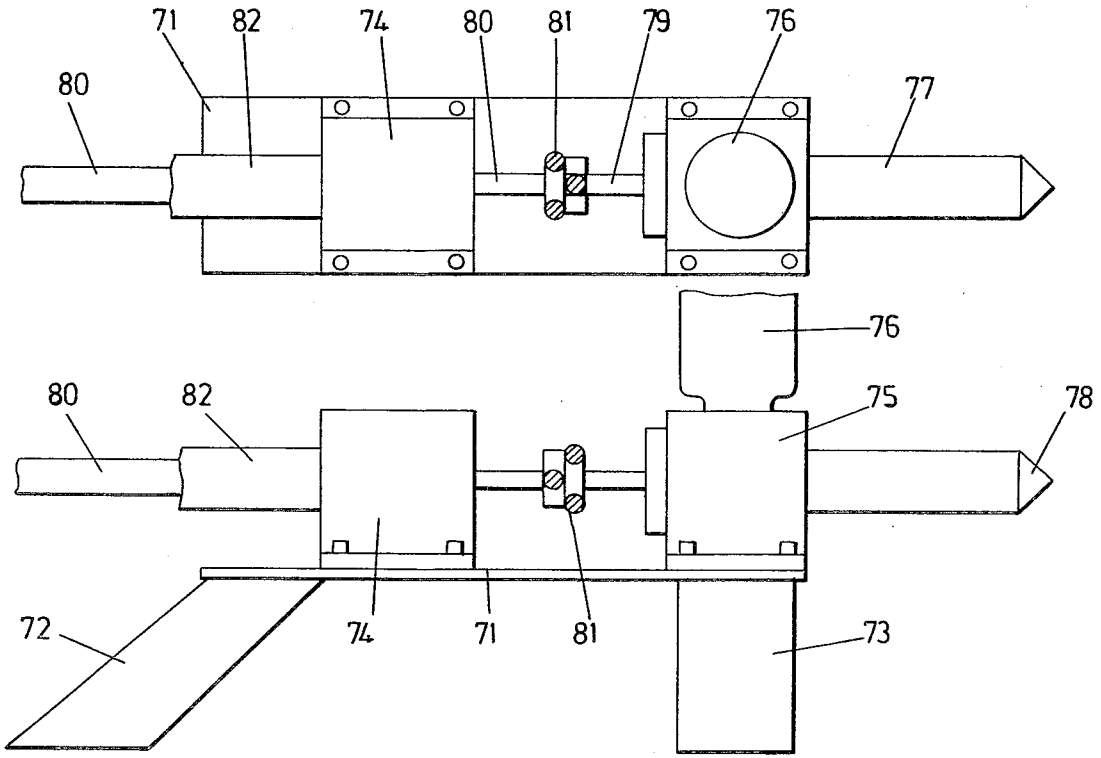
Figure 9:
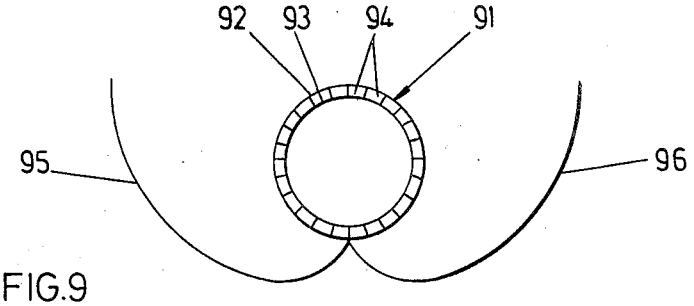
Figure 10:
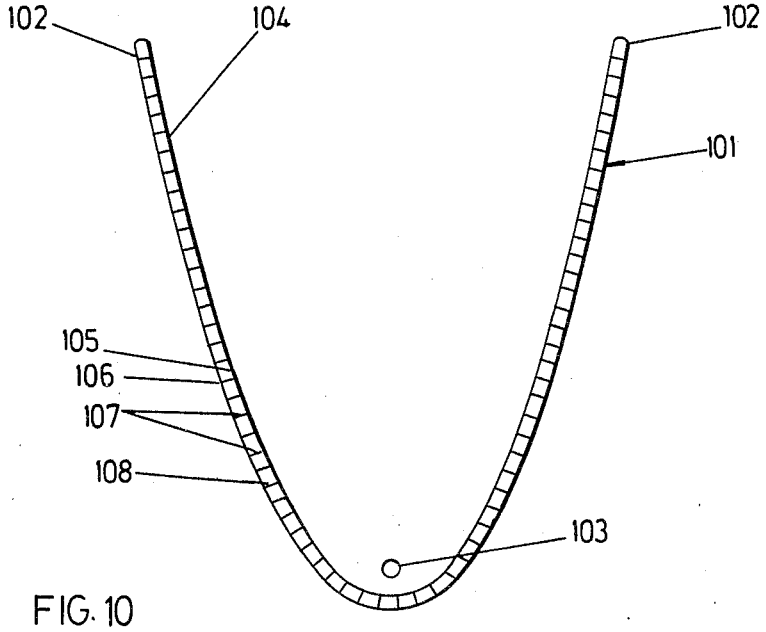

DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED NOVEMBER 2, 1976

952 O.G. 7

T952,004

HEAT EXCHANGER AND A SOLAR HEATER INCLUDING THE HEAT EXCHANGER

Derek Samuel Brackman, Stanmore, England, assignor to Imperial Chemical Industries Limited, London, England

Filed Jan. 31, 1975, Ser. No. 546,147
Claims priority, application Great Britain, Feb. 7, 1974, 5,638/74; Jan. 15, 1975, 1,729/75
Int. Cl.$^2$ F24J *3/02*
U.S. Cl. 126—271
5 Sheets Drawing. 26 Pages Specification

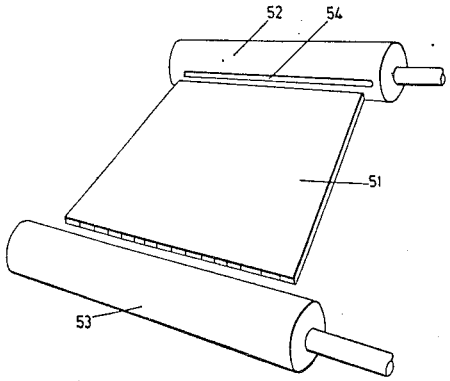

A heat exchanger formed of headers joined together by means of plastics extrudate comprising a multiplicity of channels which provide paths for the passage of a fluid between the headers, the plastics being a highly crystalline polyolefin of the type which can be made using transition metal polymerization catalysts. The preferred polyolefin is polypropylene homopolymer or copolymer with up to 15% by weight of ethylene. Profile extruded packaging boards are convenient, and are readily attached to the headers with negligible distortion of the thin boards, by extruding polypropylene sealer into contact with both of them in juxtaposition so that it fuses to them and on cooling joins them together. The heat exchanger is suitable as a solar panel either exposed or enclosed in a thermally insulated chamber having a window to admit solar radiation.

HEAT EXCHANGER AND A SOLAR HEATER INCLUDING THE HEAT EXCHANGER

Original Filed Jan. 31, 1975